US012638163B2

(12) United States Patent
Vidakovic

(10) Patent No.: US 12,638,163 B2
(45) Date of Patent: May 26, 2026

(54) SYSTEMS AND METHODS FOR TRIM RETAINMENT USING REPELLING MAGNETS

(71) Applicant: SIGNIFY HOLDING B.V., Eindhoven (NL)

(72) Inventor: Voya Vidakovic, Marietta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/105,840

(22) PCT Filed: Aug. 18, 2023

(86) PCT No.: PCT/EP2023/072753
§ 371 (c)(1),
(2) Date: Feb. 24, 2025

(87) PCT Pub. No.: WO2024/041983
PCT Pub. Date: Feb. 29, 2024

(65) Prior Publication Data

US 2026/0063283 A1 Mar. 5, 2026

Related U.S. Application Data

(60) Provisional application No. 63/400,541, filed on Aug. 24, 2022.

(30) Foreign Application Priority Data

Sep. 6, 2022 (EP) .................................... 22194038

(51) Int. Cl.
*F21V 21/096* (2006.01)
*F21V 15/01* (2006.01)
(Continued)

(52) U.S. Cl.
CPC ............ *F21V 21/096* (2013.01); *F21V 15/01* (2013.01); *F21V 17/005* (2013.01); *F21V 21/047* (2013.01); *F21V 29/70* (2015.01)

(58) Field of Classification Search
CPC ........ F21V 21/096; F21V 21/70; F21V 15/01; F21V 17/105; F21V 21/047
(Continued)

(56) References Cited

U.S. PATENT DOCUMENTS 11,592,170 B2 * 2/2023 Hawkins ................ F21V 29/75
11,674,649 B2 * 6/2023 David ..................... F21V 17/06
362/147
(Continued)

FOREIGN PATENT DOCUMENTS

CN 112762386 A 5/2021
GB 2239307 A 6/1991
(Continued)

*Primary Examiner* — Laura K Tso

(57) ABSTRACT

A lighting assembly (10), including a housing (100), a trim assembly (200), a housing magnet (300), and a trim magnet (400), is provided. The housing (100) includes a cavity (102) extending along a central axis (A1). The trim assembly (200) inserts into the cavity (102). The housing magnet (300) is mounted in the cavity (102). A first pole (302) having a first polarity (P1) of the housing magnet (300) is oriented towards the central axis (A1). The trim magnet (400) is mounted to the trim assembly (200). A first pole (402) of the trim magnet (400) is oriented away from the central axis (Al) of the housing (100). The first pole (402) of the trim magnet (400) has the first polarity (P1) to repel the housing magnet (302). The first pole (302) of the housing magnet (300) repels the first pole (402) of the trim magnet (400) in a first direction (D1) when the housing magnet (300) is above the trim magnet (400), and in a second direction (D2) when the housing magnet (300) is below the trim magnet (400) to retain the trim assembly (200).

15 Claims, 14 Drawing Sheets

(51) Int. Cl.
*F21V 17/00* (2006.01)
*F21V 21/04* (2006.01)
*F21V 29/70* (2015.01)

(58) Field of Classification Search
USPC .......................... 362/368, 317–361, 398, 433
See application file for complete search history.

(56) References Cited

U.S. PATENT DOCUMENTS

| | | | | |
|---|---|---|---|---|
| 2005/0265016 | A1* | 12/2005 | Rappaport | F21V 17/105 362/147 |
| 2015/0362159 | A1 | 12/2015 | Ludyjan | |
| 2018/0112857 | A1 | 4/2018 | Wronski et al. | |
| 2020/0149717 | A1 | 5/2020 | Simmons, Jr. et al. | |

FOREIGN PATENT DOCUMENTS

| | | | |
|---|---|---|---|
| KR | 20120050798 | A | 5/2012 |
| WO | 2020163793 | A1 | 8/2020 |

* cited by examiner

SYSTEMS AND METHODS FOR TRIM RETAINMENT USING REPELLING MAGNETS

CROSS-REFERENCE TO PRIOR APPLICATIONS

This application is the U.S. National Phase application under 35 U.S.C. § 371 of International Application No. PCT/EP2023/072753, filed on Aug. 18, 2023, which claims the benefit of European Patent Application No. 22194038.0, filed on Sep. 6, 2022, and U.S. Provisional Application No. 63/400,541, filed on Aug. 24, 2022. These applications are hereby incorporated by reference herein.

FIELD OF THE DISCLOSURE

The present disclosure is generally directed to systems and methods for using magnets in a repelling pole orientation to produce an axial force for retaining a trim within a lighting fixture.

BACKGROUND

Ceiling-recessed lighting assemblies typically include a housing component and a trim component. The housing typically couples to a heat sink to dissipate heat generated by a light source, while the trim component includes a lens and a flange. The housing component and trim component are typically assembled by mounting the housing above the ceiling, and then inserting a portion of the trim component into the housing, such that the flange is exposed below the ceiling while the inserted portion of the trim component is retained within the housing component. In one example, a series of small, high-strength magnets are arranged around the bottom end of the housing component, while corresponding magnetic plates are arranged around the top side of the flange, such that the housing magnets attract the trim magnets to retain the trim component.

SUMMARY OF THE DISCLOSURE

The present disclosure is directed to a lighting assembly with improved systems for retaining a trim assembly within a housing using repelling, rather than attracting, magnetic forces. The housing and trim assembly each include magnets which are configured to, upon insertion of the trim assembly into the housing, be mounted radially relative to one another and generate an axial force to retain the trim assembly. This configuration both provides improved retention forces while simplifying assembly to save costs and improve manufacturing consistency.

The lighting assembly includes a housing and a trim assembly. The housing is configured to mount in a ceiling, and includes an internal cavity extending along a central axis between a top end of the housing and a bottom end of the housing. One or more housing magnets are mounted in the internal cavity of the housing. The housing magnets may be mounted into rail and snap magnet housings arranged around the internal cavity. A first pole of each housing magnet is oriented toward the central axis. The first pole of each housing magnet has a first polarity. Further, the housing also includes one or more anti-twist channels arranged within the internal cavity. The housing may also include (or be coupled to) additional components, such as one or more light sources (such as a light emitting diode (LED)) or a heat sink. The housing and/or the internal cavity may be circular, square, rectangular, or any other appropriate shape.

The trim assembly is configured to be inserted into and retained within the internal cavity of the housing. The trim assembly includes a flange configured to meet the bottom end of the housing when the trim assembly is inserted and retained in the internal cavity, such that the flange is exposed below the ceiling upon completion of assembly. One or more trim magnets are mounted to the trim assembly. The trim magnets may be secured by magnet housings arranged on a magnet carriage bonded to the trim assembly. A first pole of each trim magnet is oriented away the central axis. The first pole of each trim magnet has the same first polarity as the first polarity of the housing magnet so that the trim magnet repels the housing magnet. The trim assembly also includes one or more anti-twist tabs configured to be inserted into the one or more anti-twist channels of the housing. The trim assembly may also include additional components, such as a lens and a lens retainer.

During installation, the housing is mounted to or within the ceiling. The trim assembly is then inserted into the housing by aligning the anti-twist tabs of the trim assembly with the anti-twist channels of the housing. Before the trim assembly slides into the housing, the first poles of the housing magnets repel the first poles of the trim magnets in a downward axial direction when a center plane of the housing magnets is above a center plane of the trim magnets. Thus, until the center plane of the housing magnet meets the center plane of the trim magnet, the downward repelling force generates resistance against the insertion of the trim assembly. Once the center plane of the trim magnet crosses the center plane of the housing magnet, the first poles of the housing magnets repel the first poles of the trim magnets in an upward axial direction, thereby providing a magnetic repelling force to retain the trim assembly within the housing.

Generally, in one aspect, a lighting assembly is provided. The lighting assembly includes a housing. The housing comprises an internal cavity. The internal cavity extends along a central axis between a top end of the housing and a bottom end of the housing. The housing may be mechanically coupled to a heat sink.

The lighting assembly further includes a trim assembly. The trim assembly is configured for insertion into the internal cavity of the housing. The trim assembly may be mechanically coupled to a lens.

The lighting assembly further includes a housing magnet. The housing magnet is mounted in the internal cavity of the housing. A first pole of the housing magnet is oriented towards the central axis. The first pole has a first polarity.

The lighting assembly further includes a trim magnet. The trim magnet is mounted to the trim assembly. A first pole of the trim magnet is oriented away from the central axis of the housing. The first pole of the trim magnet has the first polarity to repel the housing magnet.

The first pole of the housing magnet repels the first pole of the trim magnet in a first direction when a center plane of the housing magnet is above a center plane of the trim magnet. The center plane of the housing magnet may perpendicularly intersect a center coordinate of the first pole of the housing magnet.

Further, the first pole of the housing magnet repels the first pole of the trim magnet in a second direction when the center plane of the housing magnet is below the center plane of the trim magnet to retain the trim assembly within the internal cavity of the housing.

According to an example, the trim assembly includes a flange. The flange is arranged to contact the bottom end of the housing when the trim assembly is retained in the internal cavity.

According to an example, the lighting assembly further comprises an LED. The LED is arranged within the lighting assembly.

According to an example, the trim assembly includes an anti-twist tab. The anti-twist tab is configured to be slidably inserted into an anti-twist channel of the housing.

According to a further example, the trim assembly includes a magnet housing. The magnet housing is configured to receive the trim magnet.

According to an example, the housing may include a plurality of magnets including the housing magnet. Further, the trim assembly may include a plurality of magnets including the trim magnet.

According to an example, the housing magnet and the trim magnet are arc segment magnets.

According to an example, the housing magnet and the trim magnet may be neodymium magnets that have a grade of N50 and inside and outside surfaces. The housing magnet has the first pole and the first polarity on the inside surface. The trim magnet has the first pole and the first polarity on the outside surface.

Generally, in another aspect, a method for manufacturing a light assembly is provided. The method includes providing a housing. The housing includes an internal cavity. The internal cavity extends along a central axis between a top end of the housing and a bottom end of the housing.

The method further includes mounting a housing magnet in the internal cavity of the housing. A first pole of the housing magnet is oriented towards the central axis. The first pole has a first polarity.

The method further includes providing a trim assembly. The trim assembly is configured for insertion into the internal cavity of the housing.

The method further includes mounting a trim magnet to the trim assembly. A first pole of the trim magnet is oriented away from the central axis of the housing when the trim assembly is inserted into the housing. The first pole of the trim magnet has the first polarity to repel the housing magnet.

The first pole of the housing magnet repels the first pole of the trim magnet in a first direction when a center plane of the housing magnet is above a center plane of the trim magnet. Further, the first pole of the housing magnet repels the first pole of the trim magnet in a second direction when the center plane of the housing magnet is below the center plane of the trim magnet to retain the trim assembly within the internal cavity of the housing.

According to an example, the trim assembly includes a flange that contacts the bottom end of the housing when the trim assembly is retained in the internal cavity.

According to an example, the step of mounting the trim magnet includes placing the trim magnet into a magnet housing of the trim assembly.

According to an example, the step of providing the housing includes providing anti-twist channel. Further to this example, the step of providing the trim assembly includes providing an anti-twist tab, and the anti-twist channel of the housing is configured to receive the anti-twist tab when the trim assembly is inserted into the internal cavity. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is directed to a lighting assembly with improved systems for retaining a trim assembly within a housing using repelling, rather than attracting, magnetic forces. Applicant has recognized and appreciated that it would be beneficial to provide the housing and trim assembly with magnets that are oriented so that their poles are opposing each other and repelling each other and upon insertion of the trim assembly into the housing to a certain point, the repelling forces generated by the magnets interacting with each other generate an axial force to retain the trim assembly. This configuration both improves retention forces while simplifying assembly to save costs and reduce manufacturing inconsistencies.

A particular goal of utilization of the embodiments and implementations herein is to provide a mechanism for retaining a removable trim from a vast array of fixtures of any shape. The trim can be removably retained by magnets, spring, and/or friction. While the retaining mechanism can be provided with a HALO® LED downlight with a trim that is magnetically securable to eliminate gaps and light leaks, the components of the mechanism may be used with many other lighting assemblies. This disclosure should not be limited by the specific embodiments depicted and described.

Figure 1:
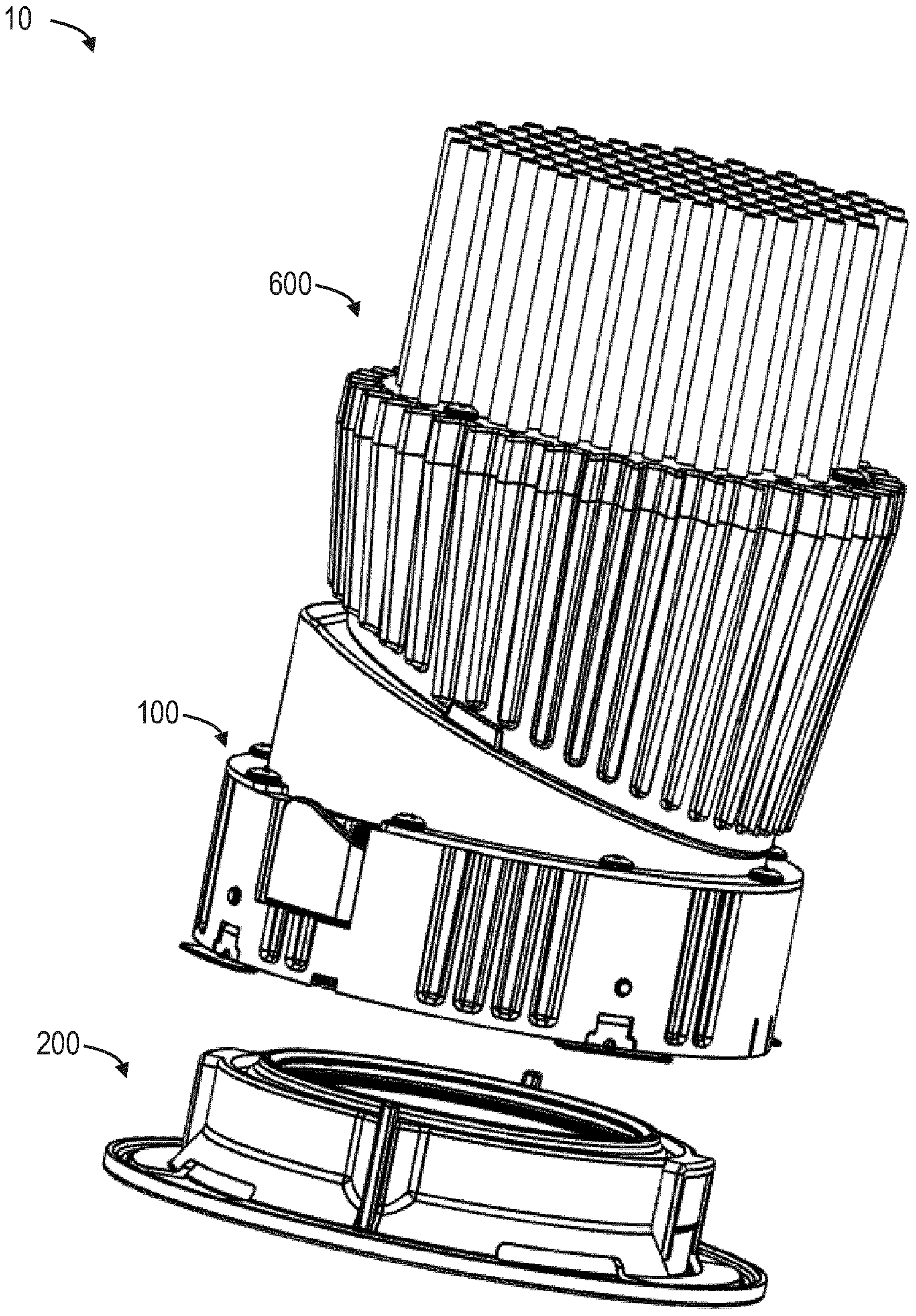
FIG. 1 is an isometric view of a lighting assembly, according to aspects of the present disclosure.

Referring now to the Figures, FIG. 1 illustrates a lighting assembly 10 according to an example of the present disclosure. The lighting assembly 10 includes a housing 100, a trim assembly 200, and a heat sink 600. The example lighting assembly 10 is configured to be a recessed lighting fixture. As a recessed lighting fixture, the lighting assembly 10 will mostly be arranged above a ceiling with only a portion of the trim assembly 200 being exposed below the ceiling. The trim assembly 200 is configured to be inserted into an internal cavity 102 (see FIG. 3) of the housing 100. While the housing 100 and trim assembly 200 are depicted as substantially circular, the housing 100 and the trim assembly 200 may be any practical shape. In the example of FIG. 1, the housing 100 and the trim assembly 200 are concentric upon insertion. As will be demonstrated in subsequent figures, the housing 100 and trim assembly 200 each contain magnets 300, 400 configured to retain the trim assembly 200 within the housing 100 using repelling forces. The heat sink 600 is primarily configured to dissipate heat generated by the light emitting diode (LED) 500 (see FIG. 13) arranged within the lighting assembly 10.

Figure 2A:
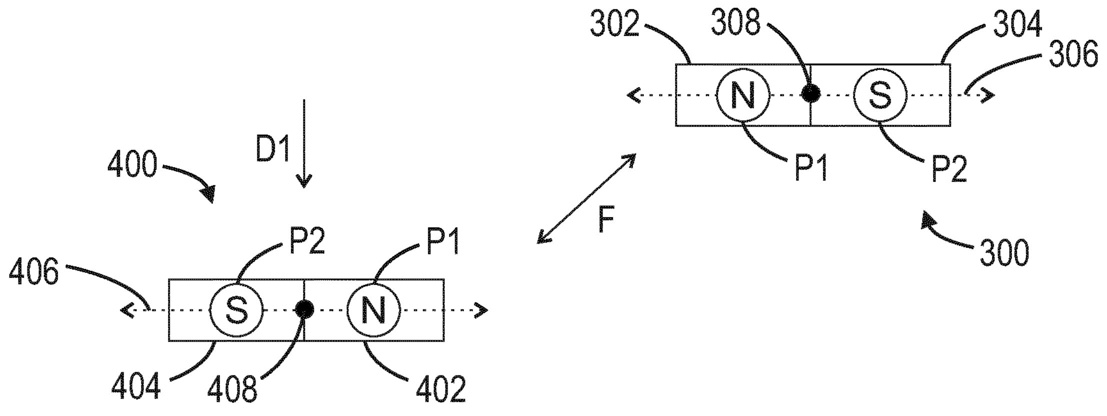
FIG. 2A illustrates repelling magnetic forces of a housing magnet and a trim magnet in a first insertion stage, according to aspects of the present disclosure.
Figure 2B:
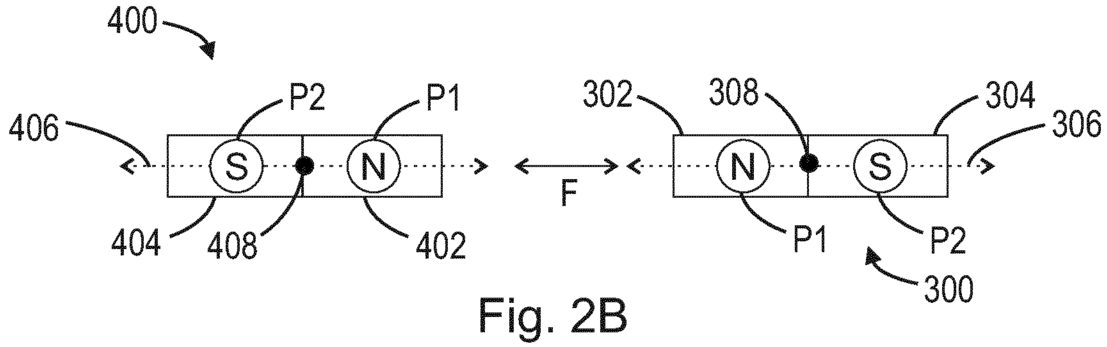
FIG. 2B illustrates repelling magnetic forces of the housing magnet and the trim magnet of FIG. 2A in a second insertion stage, according to aspects of the present disclosure.
Figure 2C:
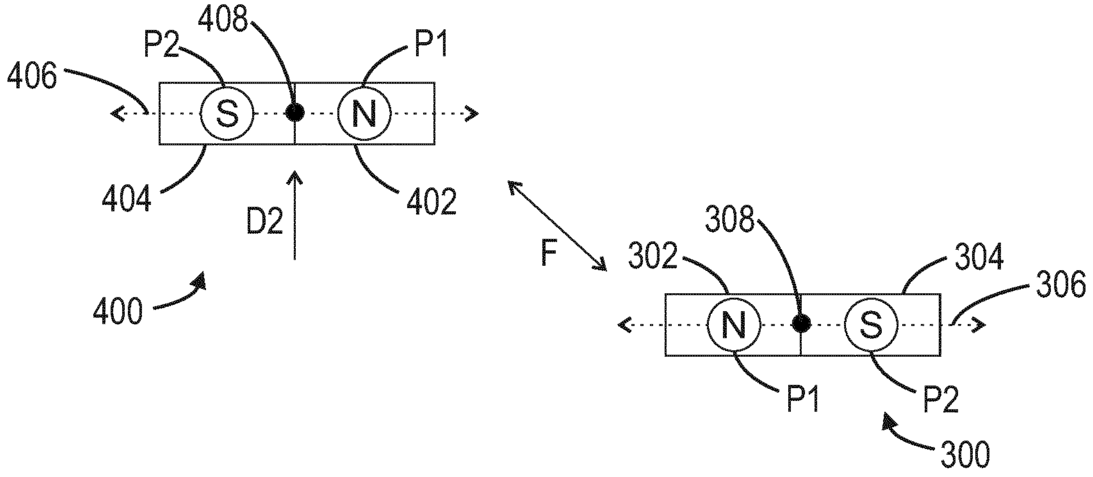
FIG. 2C illustrates repelling magnetic forces of the housing magnet and the trim magnet of FIGS. 2A and 2B in a third insertion stage, according to aspects of the present disclosure.

FIGS. 2A-2C demonstrate the scheme of repelling magnetic forces used to retain the trim assembly 200 within the housing 100. Although each of FIGS. 2A-2C shows a single housing magnet 300 and a single trim magnet 400, any number of magnets is contemplated. The housing 100 includes one or more housing magnets 300, while the trim assembly 200 includes one or more trim magnets 400. The housing magnets 300 and the trim magnets 400 may be any appropriate shape, such as circular (ring-shaped), semicircular, or rectangular. The housing magnets 300 may be the same shape as the trim magnets 400 or they may be shaped differently. In one example, the housing magnets 300 and the trim magnets 400 are N50 forty-five-degree nickel plated magnets. For example, the housing magnets 300 can comprise neodymium arc segment magnets that have a grade of N50, the north polarity on the inside face of the arc segment, and the south polarity on the outside face of the arc segment, available from K&J Magnetics Inc. in Jamison, Pennsylvania, USA (product number AX2C45-S). The trim magnets 400 can comprise neodymium arc segment magnets that have a grade of N50, the north polarity on the outside face of the arc segment, and the south polarity on the inside face of the arc segment, available from K&J Magnetics Inc. in Jamison, Pennsylvania, USA (product number AX2C45-N).

Each housing magnet 300 is defined by a first pole 302 having a first polarity P1 and a second pole 304 having a second polarity P2. In the examples of FIGS. 2A-2C, the first polarity P1 is magnetic north, and the second polarity P2 is magnetic south but the poles can be reversed in alternate embodiments. Each housing magnet 300 is further defined by a center plane 306 bisecting the housing magnet 300. The center plane 306 passes through a center coordinate 308 of the housing magnet 300. The center coordinate 308 is arranged at the three-dimensional center of the housing magnet 300.

Similarly, each trim magnet 400 is defined by a first pole 402 having a first polarity P1 and a second pole 404 having a second polarity P2. As with the housing magnet 300, the first polarity P1 is magnetic north, and the second polarity P2 is magnetic south. Further, as shown in FIGS. 2A-2C, the first pole 402 of the trim magnet 400 faces the first pole 302 of the housing magnet 300, resulting in a repelling force F pushing the trim magnet 400 away from the housing magnet 300. Each trim magnet 400 is further defined by a center plane 406 bisecting the trim magnet 400. The center plane 406 passes through a center coordinate 408 of the trim magnet 400. The center coordinate 408 is arranged at the three-dimensional center of the trim magnet 400.

FIGS. 2A-2C illustrate three different states of repelling magnetic forces F when inserting the trim assembly 200 into the housing 100. In the first insertion stage, as demonstrated in FIG. 2A, the center planes 406 of the trim magnets 400 are below the center planes 306 of the corresponding housing magnets 300. In other words, the center planes 306 of the housing magnets 300 are above the center planes 406 of the trim magnets 400. Thus, magnetic forces F repel the trim housing 200 in at least a first direction D1 downward axially away from the housing 100, resulting in some amount of resistance when inserting the trim assembly 200 into the housing 100. This state is shown in greater detail in FIG. 10.

As a user or installer urges the trim assembly 200 into the cavity of the housing 100 overcoming the amount of resistance provided by the housing magnets, the center planes 406 of the trim magnets 400 will eventually align with the center planes 306 of the corresponding housing magnets, as shown in the second insertion stage in FIG. 2B. At this point, the magnetic forces F from the housing magnets 300 no longer provide a downward repelling force F on the trim housing 200. Instead the magnetic forces F between the housing and trim magnets 300, 400 are entirely horizontal. In practice, the magnetic forces F may cause the housing 100 and trim assembly 200 to squirm or twist, e.g., circumferentially relative to each other. In other words, when the center planes of the housing and trim magnets meet, the most prominent force direction is in the radial direction which then translates to a rotational direction if not for the anti-twist mechanism. It should be appreciated that the clocking of the trim and housing magnets cannot be off by a length of the magnet. Otherwise, the axial force would be lost if the clocking of the trim magnet and the housing magnet is off by the length of the magnet. This second insertion state is shown in greater detail in FIG. 11. It should also be appreciated that the second insertion state is not a stable state and that the trim and housing prefer the first insertion state or the third insertion state as described below.

As a user or installer urges the trim assembly 200 further into the internal cavity of the housing 100 into the third insertion state, the center planes 406 of the trim magnets 400 are positioned above the center planes 306 of the housing magnets 300. In this third insertion stage, the magnetic forces F from the housing magnets 300 repel the trim magnets 400 in a second direction D2 upward axially further into the internal cavity of the housing 100 into a retained position. Similarly, when the center planes 406 of the trim magnets 400 are positioned above the center planes 306 of the housing magnets 300 in the third insertion state, the magnetic forces F from the trim magnets 400 repel the housing magnets 300 in the first direction D1. These upward and downward forces retain the trim assembly 200 within the housing 100. This third insertion state is shown in greater detail in FIG. 12.

Figure 3:
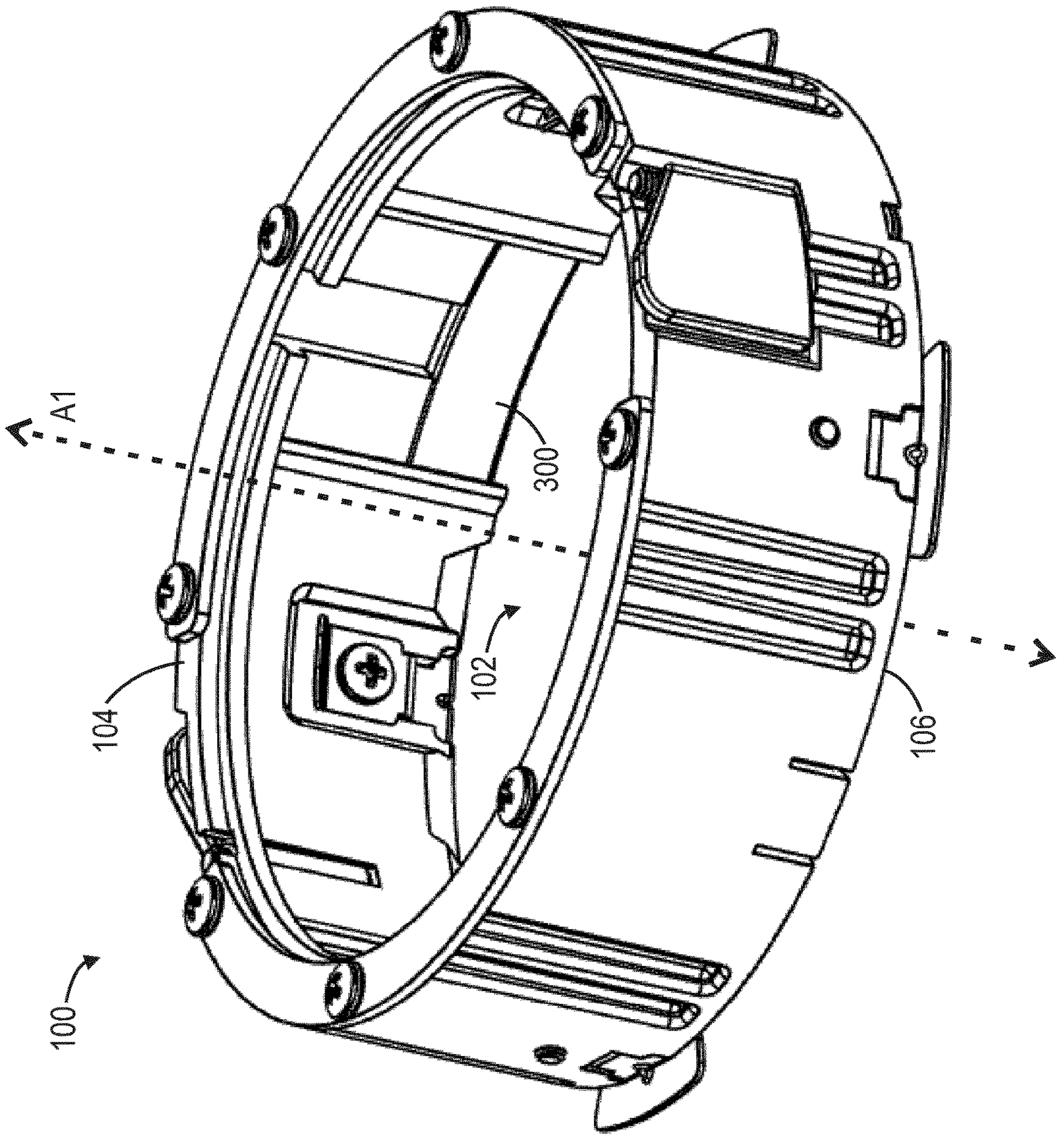
FIG. 3 is a top isometric view of a housing of the lighting assembly, according to aspects of the present disclosure.

FIG. 3 is a top isometric view of the housing 100. While the housing 100 of FIG. 3 is circular, the housing 100 may be any other practical shape. The housing 100 is defined by an internal cavity 102, a top end 104, and a bottom end 106. The internal cavity 102 extends along a central axis Al between the top end 104 and the bottom end 106. As shown in FIG. 1, the top end 104 of the housing 100 may be coupled to a heat sink 600, while the bottom end 106 meets a flange 202 (see FIG. 6) of the trim assembly 200 when the trim assembly 200 is fully inserted into the internal cavity 102. A housing magnet 300 is fixed to the housing 100. In the example of FIG. 3, the housing magnet 300 has a semicircular shape corresponding to the shape of the housing 100. The housing 100 also includes a second housing magnet 300 on the opposite side of the housing 100. While this housing 100 includes two housing magnets 300, other housings 100 may include more than two housing magnets 300. In embodiments including two or more housing magnets 300, it should be appreciated that the two or more housing magnets 300 can be equally spaced about the circumference or perimeter of the housing Alternatively, some embodiments may include a single housing magnet 300 configured as a ring around the entire circumference or perimeter of the housing 100.

Figure 4:
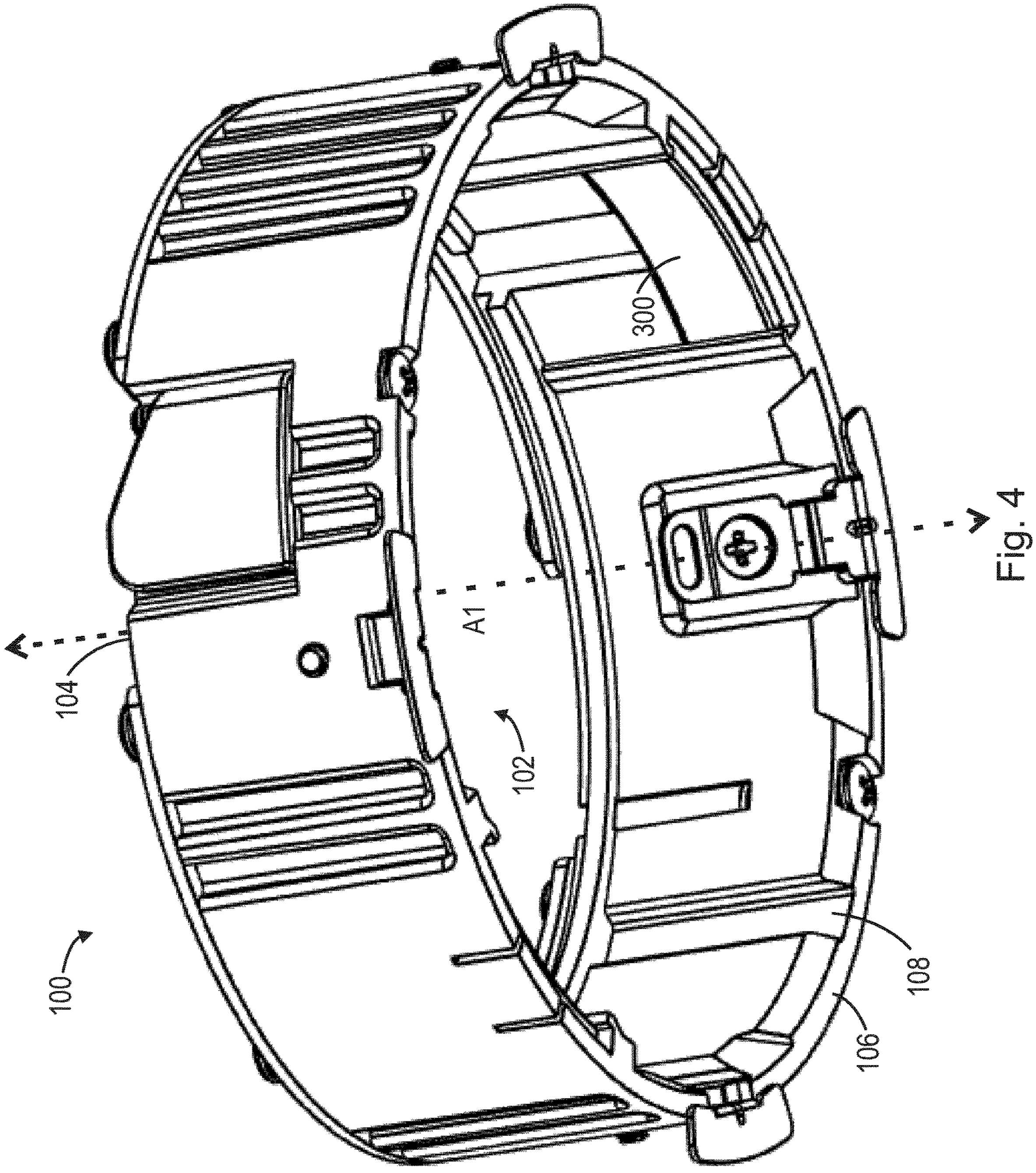
FIG. 4 is a bottom isometric view of the housing of the lighting assembly, according to aspects of the present disclosure.

FIG. 4 is a bottom isometric view of the housing 100 of FIG. 3. In addition to the features shown in FIG. 3, FIG. 4 shows the housing 100 as including an anti-twist channel 108. As will be described in greater detail below, the anti-twist channel 308 is configured to receive an anti-twist tab 204 of the trim assembly 200 during insertion of the trim assembly 200 into the housing 100. In the example of FIG. 4, the housing 100 further includes a second anti-twist channel 108 on the opposite side of the housing 100. Any appropriate number of anti-twist channels 108 may be used depending on the application. The insertion of the anti-twist tab 204 into the anti-twist channel 308 limits the squirming of the housing 100 and the trim assembly 200 during the second insertion stage illustrated in FIGS. 2B and 11.

Figure 5:
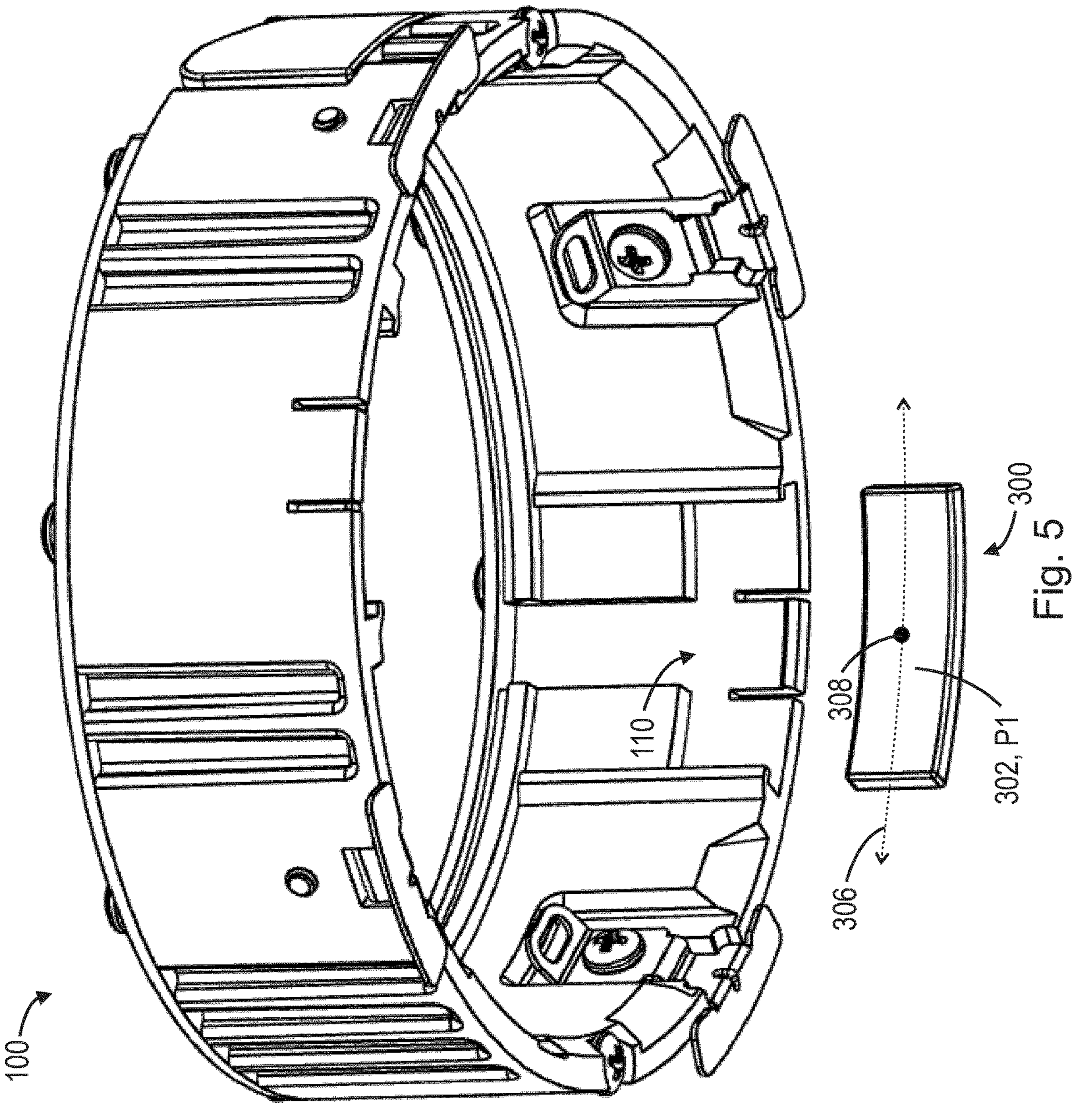
FIG. 5 is a bottom isometric view of the housing of the lighting assembly similar to FIG. 4 with a housing magnet separated, according to aspects of the present disclosure.

FIG. 5 is a further bottom isometric view of the housing 100 with the housing magnet 300 separated. The housing magnet 300 mechanically couples to the housing 100 via magnet receptacle 110. In the example of FIG. 5, the magnet receptacle 110 includes rail-and-snap features for a snap-to-fit configuration. The removed housing magnet 300 has a first pole 302 of a first polarity P1 (such as magnetic north) on its inside face and a second pole 304 (see FIGS. 2A-2C). of the opposite polarity P2 (such as magnetic south) on its outside face. The first pole 302 on the inside face is oriented to face the central axis A1 (see FIG. 3) found within the internal cavity 102 (see FIG. 3). The second pole on the outside face is oriented to face away from the central axis. A center plane 306 bisects the housing magnet 300 and passes through a center coordinate 308.

Figure 6:
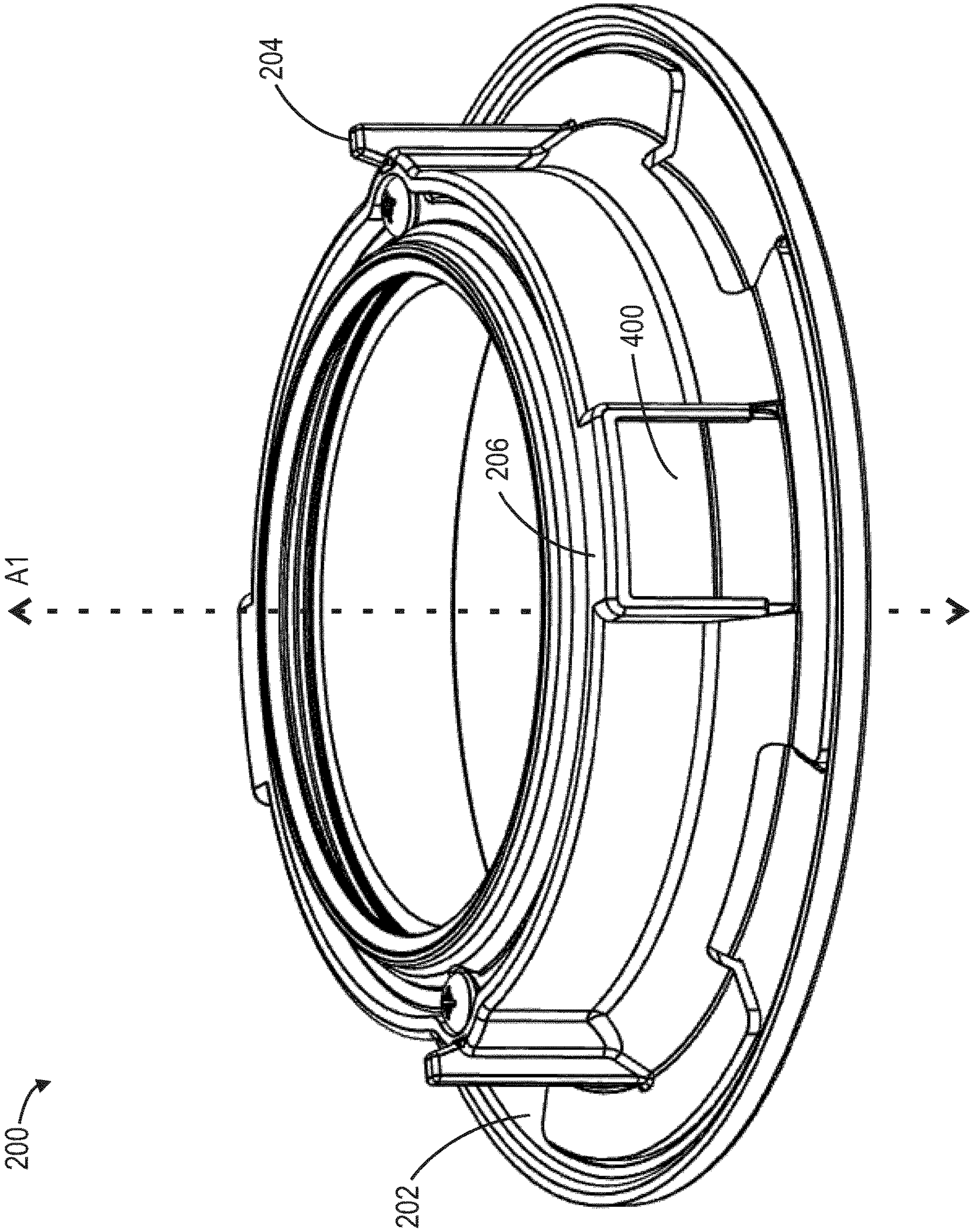
FIG. 6 is a top isometric view of a trim assembly of the lighting assembly, according to aspects of the present disclosure.
Figure 7:
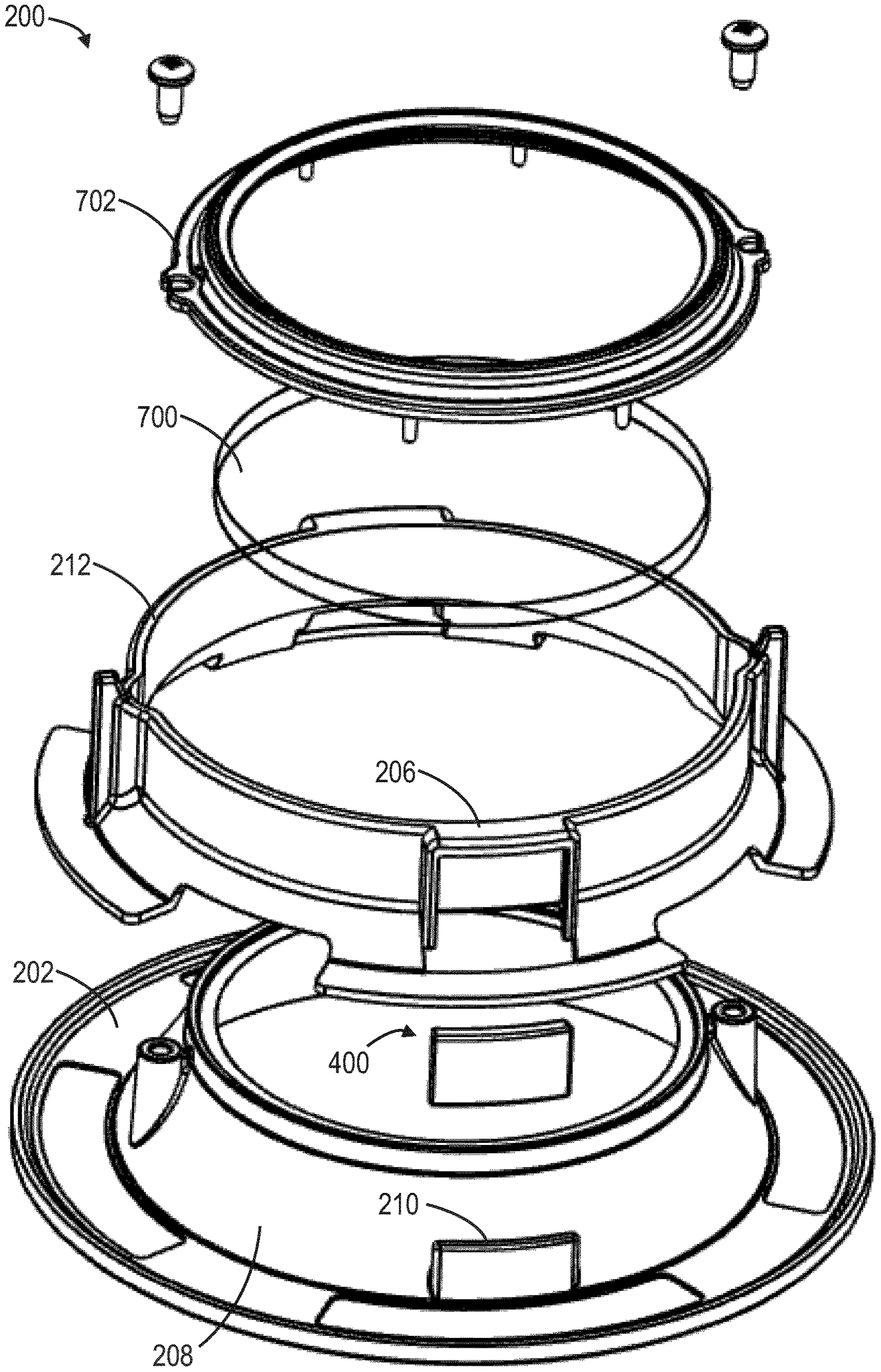
FIG. 7 is an exploded view of the trim assembly of FIG. 6, according to aspects of the present disclosure.

FIG. 6 is an isometric view of the trim assembly 200. FIG. 7 illustrates an exploded view of the same trim assembly 200 of FIG. 6. The trim assembly 200 includes a flange 202, a pair of anti-twist tabs 204, a pair of magnet housings 206, a trim body 208, a pair of follower tabs 210, and a magnet carriage 212 arranged around central axis A1. The flange 202 is coupled to the trim body 208 and is configured to meet with the bottom end 106 of the housing 100 upon insertion of the trim assembly 200 into the internal cavity 102 of the housing 100. The anti-twist tabs 204 are coupled to or integrated within the magnet carriage 212. Each anti-twist tab 204 is configured to slide into an anti-twist channel 108 of the housing 100 (see FIG. 4) to limit squirming and twisting during insertion of the trim assembly 200. The trim assembly 200 of FIG. 6 is configured to hold a pair of diametrically opposed trim magnets 400. The trim magnets 400 are arranged within magnet housings 206 of the magnet carriage 212. Further, the trim magnets 400 are held within the magnet housings 206 by follower tabs 210 coupled to or integrated within the trim body 208.

Further, FIGS. 6 and 7 show a lens 700 fixed to the trim assembly 200 via a lens retainer 702. The lens may be configured to direct, shape, diffuse, or otherwise treat the light generated by the LED 500 (see FIG. 13) of the lighting assembly 10.

Figure 8:
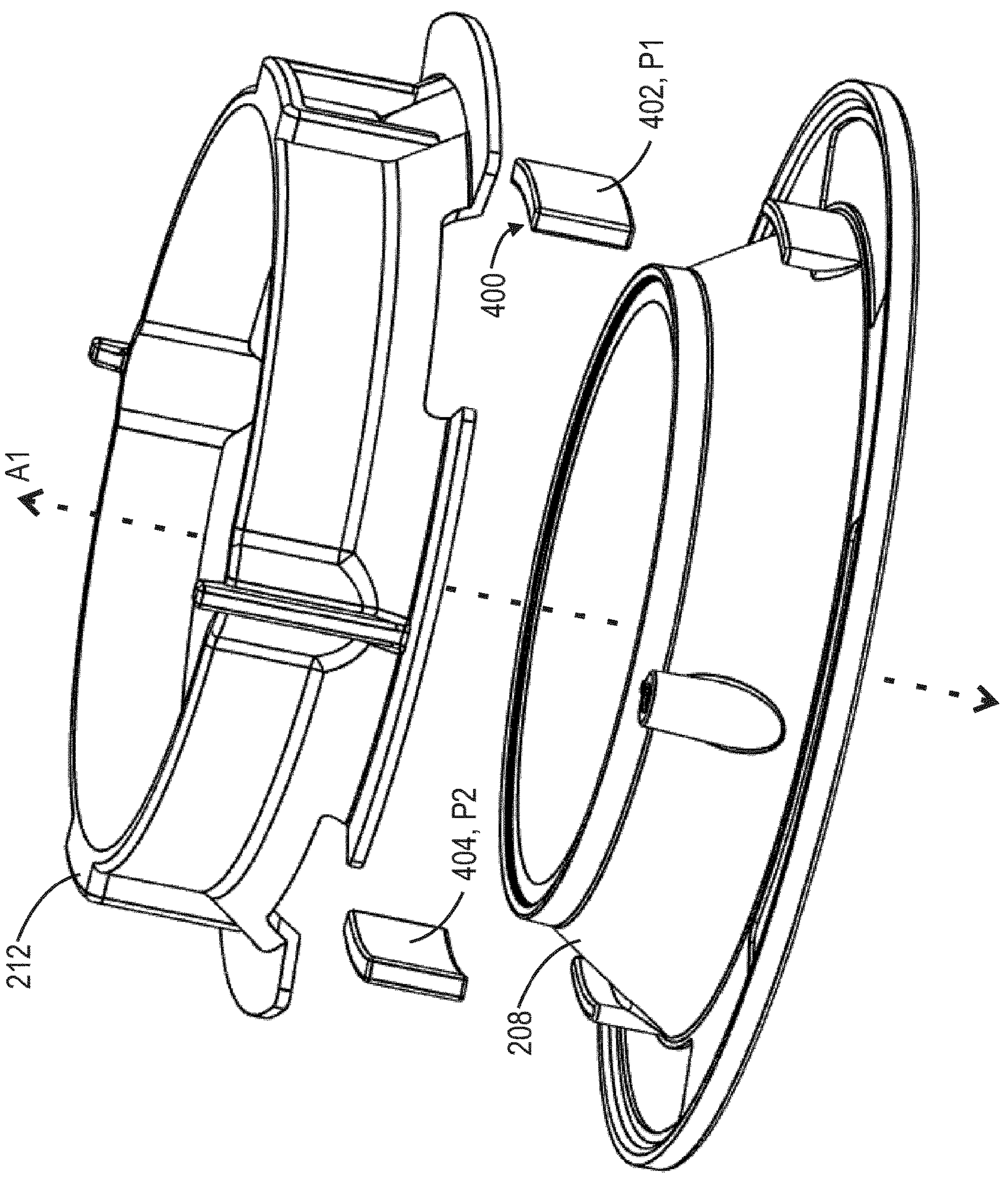
FIG. 8 is an exploded view of a trim body, magnet carriage, and trim magnet, according to aspects of the present disclosure.
Figure 9:
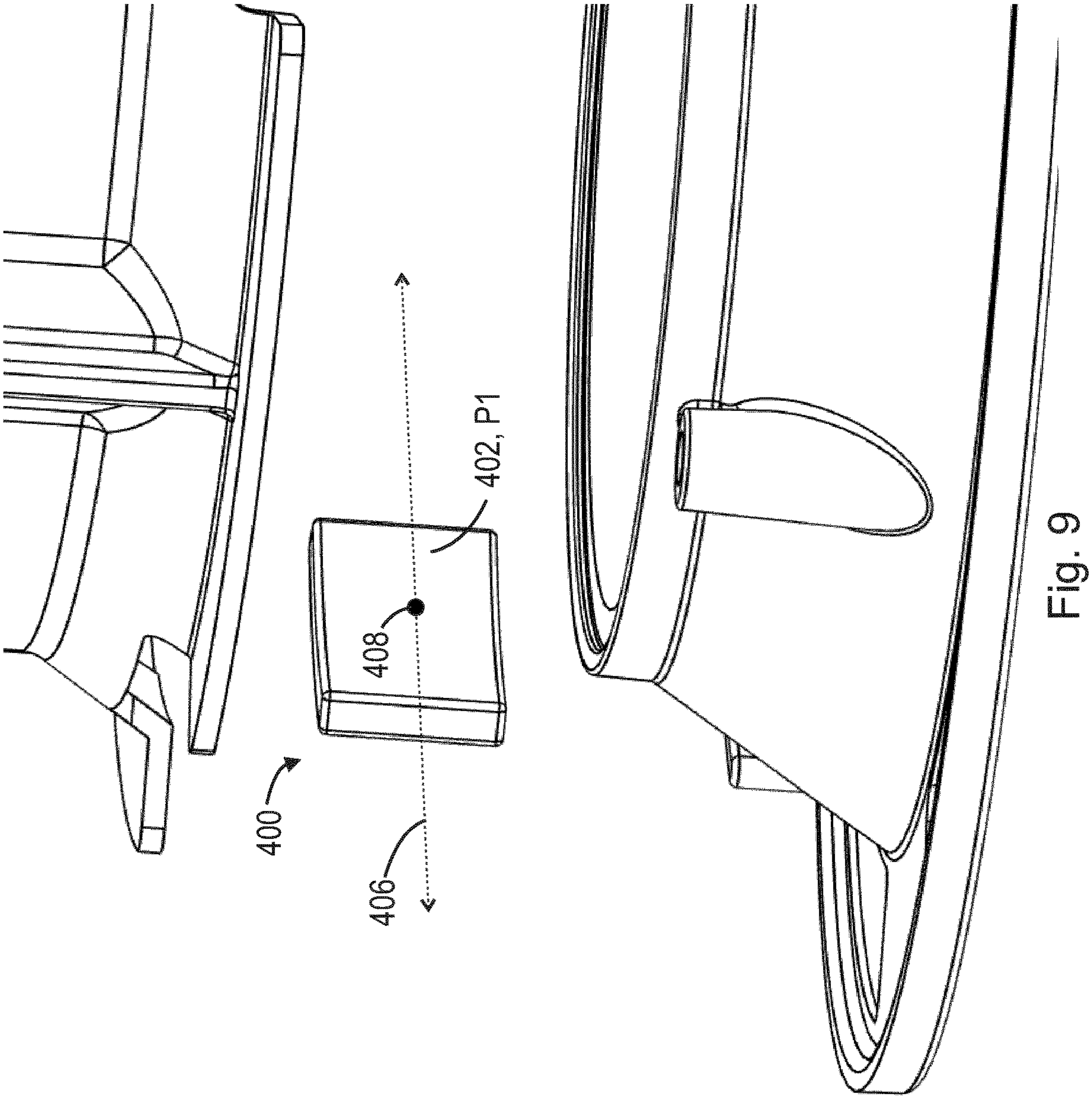
FIG. 9 is an isometric view of the trim magnet of FIG. 8, according to aspects of the present disclosure.

FIG. 8 shows another exploded view of the trim body 208, the trim carriage 212, and the trim magnets 400. As shown in FIG. 8, the trim magnets 400 include a first pole 402 having a first polarity P1 (such as magnetic north) on their outside faces. The first poles 402 of the trim magnets 400 are oriented to face away from the central axis A1. It should be appreciated that the trim magnets 400 include a second pole 404 having a second polarity P2 (such as magnetic south) on their inside faces and these second poles 404 are oriented to face toward the central axis A1. Further, as shown in FIG. 9, trim magnets 400 may be defined by a center plane 406 bisecting the trim magnets 400 through a center coordinate 408.

Figure 10:
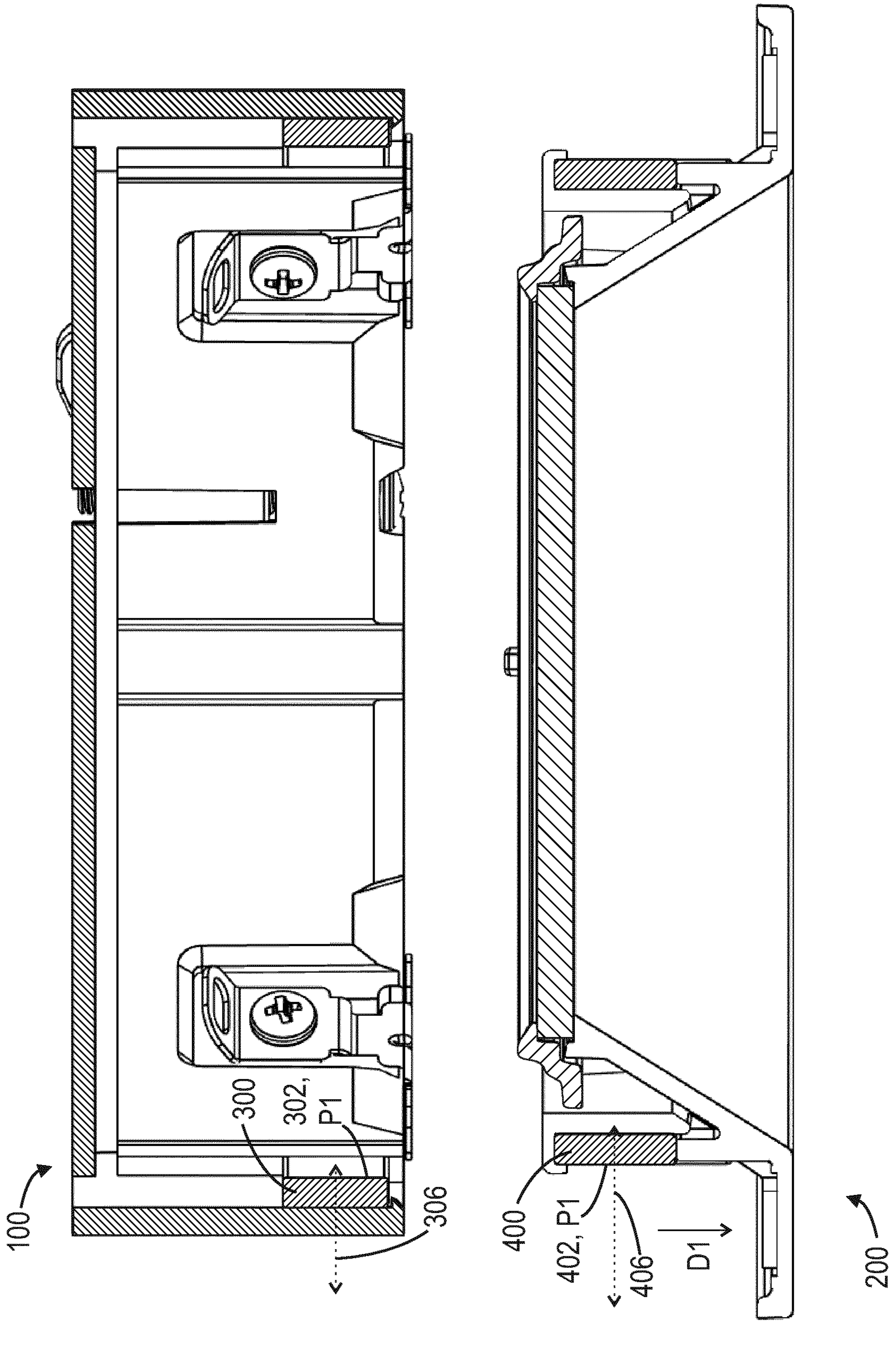
FIG. 10 is a cross-sectional view that illustrates the trim assembly and the housing in the first insertion stage, according to aspects of the present disclosure.
Figure 11:
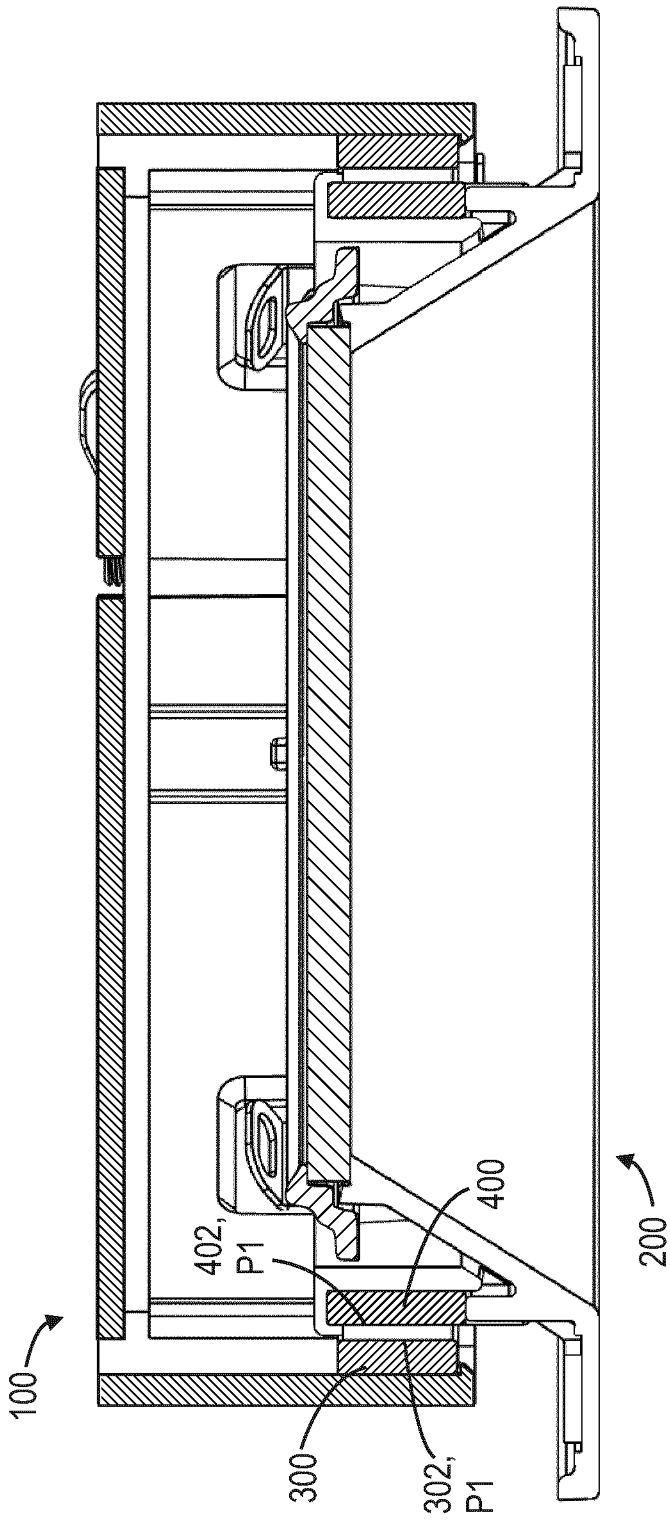
FIG. 11 is a cross-sectional view that illustrates the trim assembly and the housing in the second insertion stage, according to aspects of the present disclosure.
Figure 12:
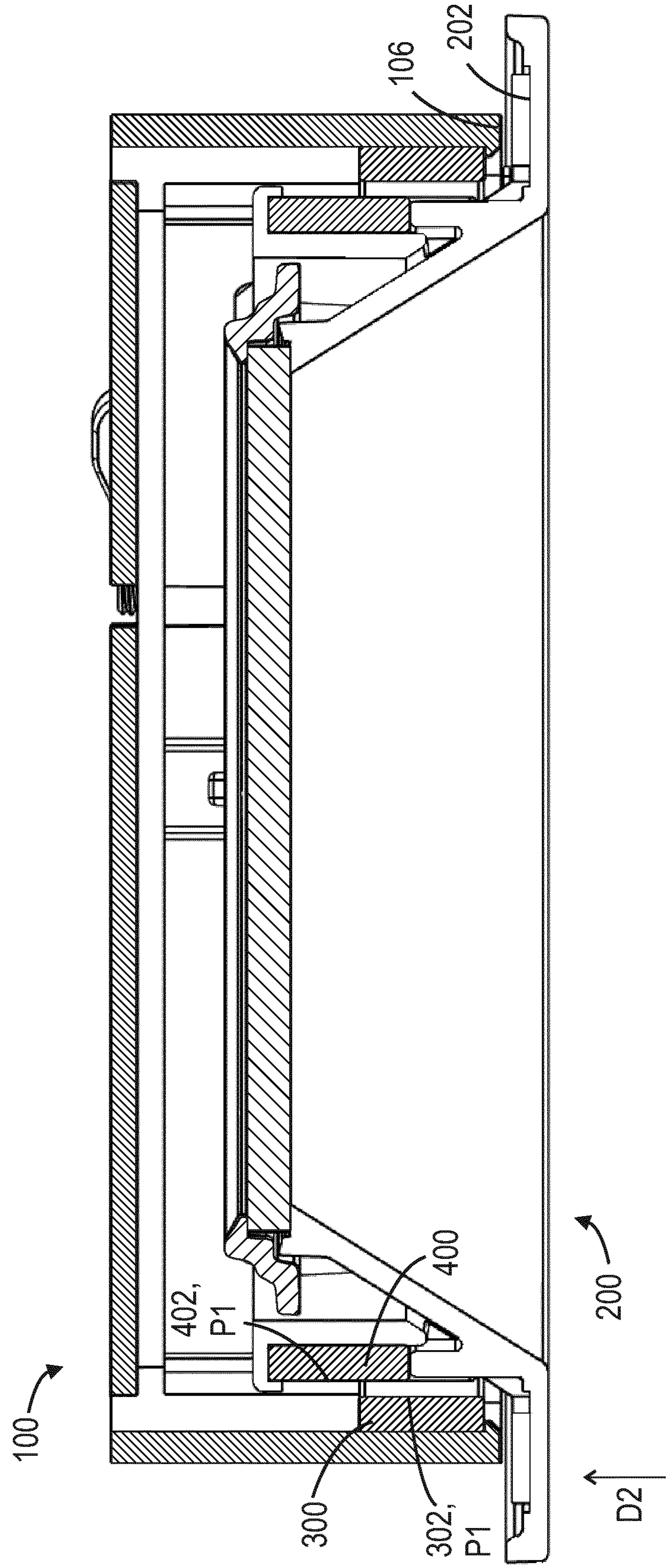
FIG. 12 is a cross-sectional view that illustrates the trim assembly and the housing in the third insertion stage, according to aspects of the present disclosure.

FIGS. 10-12 show a sectional view of the insertion stages of the trim assembly 200 into the housing. FIGS. 10-12 correspond to the insertion stages of FIGS. 2A-2C, although the center planes 306, 406 of the magnets 300, 400 are omitted in FIGS. 11 and 12 for clarity. In each figure, the first poles 302 of the housing magnets 300 face inward, while the first poles 402 of the trim magnets 400 face outward. As the first poles 302, 402 of each magnet have the first polarity P1 (such as magnetic north), the first pole 302 of the housing 300 will repel the first pole 402 of the trim assembly 400.

In FIG. 10, the center plane 406 of the trim magnet 400 is arranged below the center plane 306 of the housing magnet 300. Accordingly, the repelling force caused by the interaction of the first poles 302, 402 forces the trim assembly 200 to generate a downward force in a first direction D1 resisting the insertion. As the insertion continues, the center planes 306, 406 eventually vertically align as shown in FIG. 11. Since the first poles 302, 402 of the magnets have the same polarity, i.e., polarity P1, the repelling force is mostly horizontal relative to the magnets 300, 400, and may cause the housing 100 and trim assembly 200 to squirm and/or twist relative to each other. This squirming may be prevented by the anti-twist tabs 204 of the trim assembly 200 (see FIG. 6) that are engaged with the anti-twist channels 108 of the housing 100. Alternatively, this squirming may be prevented by using a pair of ring magnets as the housing and trim magnets 300, 400. Then, in FIG. 12, as the insertion of the trim assembly 200 continues, the center plane 406 of the trim magnet 400 is arranged above the center plane 306 of the housing magnet 300. Accordingly, the repelling force caused by the interaction of the first poles 302, 402 forces the trim assembly 200 into a retained configuration with the housing 100. While the repelling forces urge the trim assembly 200 in the downward direction D1 when the center plane of the trim magnet is arranged below the center plane of the housing magnet (as shown in FIG. 10), the repelling forces urge the trim assembly 200 in the upward direction D2 when the center plane of the trim magnet 400 is arranged above the center plane of the housing magnet. It should also be appreciated that while the repelling forces urge the trim assembly 200 in the upward direction D2 in FIG. 12, the repelling forces also urge the housing 100 in the downward direction D1. The repelling force applied in this second direction D2 forces the flange 202 of the trim assembly 200 into contact with the bottom end 106 (see FIG. 3) of the housing 100, thus retaining the other components of the trim assembly 200 within the housing 100.

Figure 13:
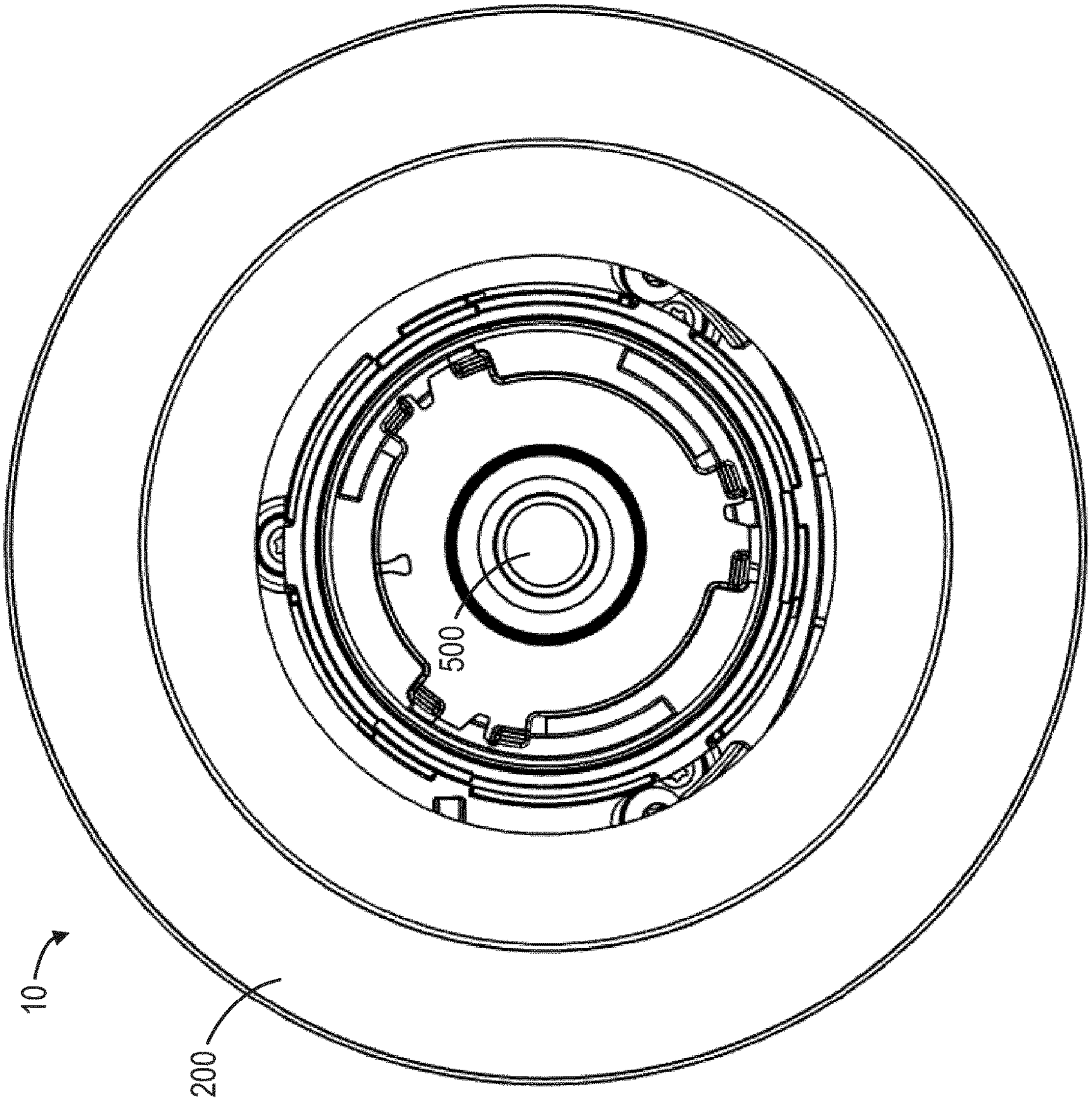
FIG. 13 is a bottom view of the lighting assembly, according to aspects of the present disclosure.

FIG. 13 illustrates a bottom view of the lighting assembly 10. This view shows an LED 500 positioned within the heat sink 600. The LED 500 is also arranged concentrically relative to the housing 100 (see FIG. 3) and the trim assembly 200.

Figure 14:
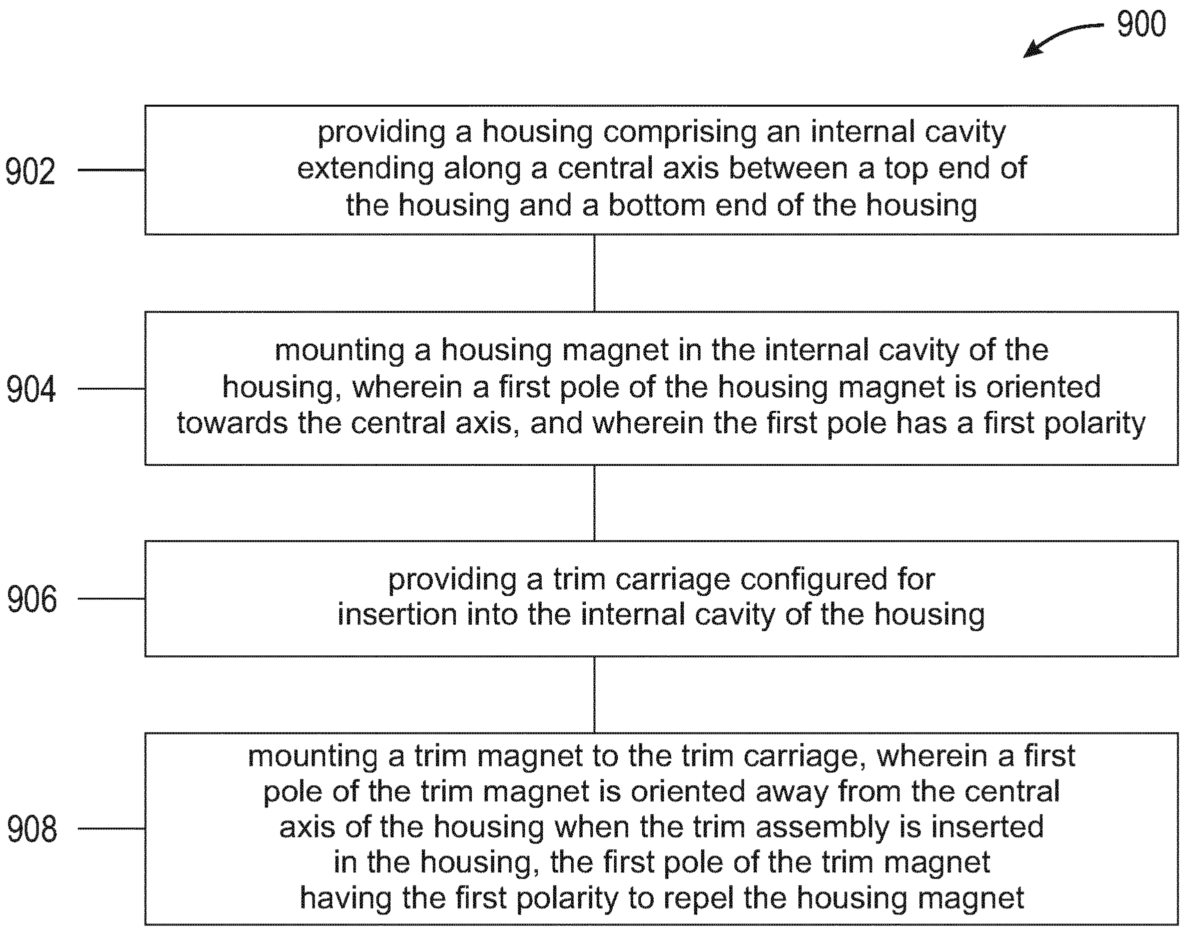
FIG. 14 is a method for manufacturing a lighting assembly, according to aspects of the present disclosure.

FIG. 14 is a flowchart of a method 900 for manufacturing a lighting assembly. The method 900 includes providing 902 a housing. The housing includes an internal cavity. The internal cavity extends along a central axis between a top end of the housing and a bottom end of the housing.

The method 900 further includes mounting 904 a housing magnet in the internal cavity of the housing. A first pole of the housing magnet is oriented towards the central axis. The first pole has a first polarity.

The method 900 further includes providing 906 a trim assembly. The trim assembly is configured for insertion into the internal cavity of the housing.

The method 900 further includes mounting 908 a trim magnet to the trim assembly. A first pole of the trim magnet is oriented away from the central axis of the housing when the trim assembly is inserted into the housing. The first pole of the trim magnet has the first polarity to repel the housing magnet.

The first pole of the housing magnet repels the first pole of the trim magnet in a first direction when a center plane of the housing magnet is above a center plane of the trim magnet. Further, the first pole of the housing magnet repels the first pole of the trim magnet in a second direction when the center plane of the housing magnet is below the center plane of the trim magnet to retain the trim assembly within the internal cavity of the housing.

According to an example, the trim assembly includes a flange that contacts the bottom end of the housing when the trim assembly is retained in the internal cavity.

According to an example, the trim magnet is arranged on the trim assembly by placing the trim magnet into a magnet housing of the trim assembly.

According to an example, the step of providing the housing includes providing anti-twist channel. Further to this example, the step of providing the trim assembly includes providing an anti-twist tab, and the anti-twist channel of the housing is configured to receive the anti-twist tab when the trim assembly is inserted into the internal cavity.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software, or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A lighting assembly, comprising:

a housing comprising an internal cavity extending along a central axis between a top end of the housing and a bottom end of the housing;

a trim assembly configured for insertion into the internal cavity of the housing;

a housing magnet mounted in the internal cavity of the housing, wherein a first pole of the housing magnet is oriented towards the central axis, and wherein the first pole has a first polarity; and a trim magnet mounted to the trim assembly, wherein a first pole of the trim magnet is oriented away from the central axis of the housing, the first pole of the trim magnet having the first polarity to repel the housing magnet, wherein the first pole of the housing magnet repels the first pole of the trim magnet in a first direction when a center plane of the housing magnet is above a center plane of the trim magnet; and wherein the first pole of the housing magnet repels the first pole of the trim magnet in a second direction when the center plane of the housing magnet is below the center plane of the trim magnet to retain the trim assembly within the internal cavity of the housing.

2. The lighting assembly of claim 1, wherein the trim assembly comprises a flange arranged to contact the bottom end of the housing when the trim assembly is retained in the internal cavity.

3. The lighting assembly of claim 1, further comprises a light emitting diode (LED) arranged within the lighting assembly.

4. The lighting assembly of claim 1, wherein the center plane of the housing magnet perpendicularly intersects a center coordinate of the first pole of the housing magnet.

5. The lighting assembly of claim 1, wherein the trim assembly comprises an anti-twist tab configured to be slidably inserted into an anti-twist channel of the housing.

6. The lighting assembly of claim 1, wherein the trim assembly comprises a magnet housing configured to receive the trim magnet.

7. The lighting assembly of claim 1, wherein the housing comprises a plurality of magnets comprising the housing magnet, and wherein the trim assembly comprises a plurality of magnets comprising the trim magnet.

8. The lighting assembly of claim 1, wherein the housing magnet and the trim magnet are arc segment magnets.

9. The lighting assembly of claim 1, wherein the housing magnet and the trim magnet are neodymium magnets that have a grade of N50 and inside and outside surfaces, the housing magnet having the first pole and first polarity on the inside surface and the trim magnet having the first pole and first polarity on the outside surface.

10. The lighting assembly of claim 1, wherein the housing is mechanically coupled to a heat sink.

11. The lighting assembly of claim 1, wherein the trim assembly is mechanically coupled to a lens.

12. A method for manufacturing a light assembly, comprising:

providing a housing comprising an internal cavity extending along a central axis between a top end of the housing and a bottom end of the housing;

mounting a housing magnet in the internal cavity of the housing, wherein a first pole of the housing magnet is oriented towards the central axis, and wherein the first pole has a first polarity;

providing a trim assembly configured for insertion into the internal cavity of the housing;

mounting a trim magnet to the trim assembly, wherein a first pole of the trim magnet is oriented away from the central axis of the housing when the trim assembly is inserted into the housing, the first pole of the trim magnet having the first polarity to repel the housing magnet;

wherein the first pole of the housing magnet repels the first pole of the trim magnet in a first direction when a center plane of the housing magnet is above a center plane of the trim magnet; and wherein the first pole of the housing magnet repels the first pole of the trim magnet in a second direction when the center plane of the housing magnet is below the center plane of the trim magnet to retain the trim assembly within the internal cavity of the housing.

13. The method of claim 12, wherein the trim assembly comprises a flange that contacts the bottom end of the housing when the trim assembly is retained in the internal cavity.

14. The method of claim 12, wherein the step of mounting the trim magnet comprises placing the trim magnet into a magnet housing of the trim assembly.

15. The method of claim 12, wherein the step of providing the housing comprises providing an anti-twist channel and the step of providing the trim assembly comprises providing an anti-twist tab, and the anti-twist channel of the housing is configured to receive the anti-twist tab of the trim assembly is configured to slide into an anti-twist channel of the housing when the trim assembly is inserted into the internal cavity.

* * * * *